United States Patent [19]
Conrad

[11] Patent Number: 5,211,919
[45] Date of Patent: May 18, 1993

[54] FLAT PLATE CORONA CELL FOR GENERATING OZONE

[76] Inventor: Richard H. Conrad, 950 Idylberry Rd., San Rafael, Calif. 94903

[21] Appl. No.: 826,399
[22] Filed: Jan. 27, 1992
[51] Int. Cl.⁵ .............................................. B01J 19/08
[52] U.S. Cl. ............................ 422/186.07; 422/186.14
[58] Field of Search ........................ 422/186.07, 186.14

[56] References Cited

U.S. PATENT DOCUMENTS

| | | | |
|---|---|---|---|
| 807,964 | 12/1905 | Rice | 422/186.07 |
| 994,294 | 6/1911 | Woillard | 422/186.07 |
| 4,417,966 | 11/1983 | Krauss et al. | 204/176 |
| 4,869,881 | 9/1989 | Collins | 422/186.18 |
| 4,882,129 | 11/1989 | Andrews et al. | 422/186.07 |
| 5,098,671 | 3/1992 | Shiota | 422/186.07 |

Primary Examiner—Donald P. Walsh
Assistant Examiner—Daniel Jenkins
Attorney, Agent, or Firm—Larry D. Johnson

[57] ABSTRACT

A flat plate corona cell for generating ozone with a generally convergent radial gas flow. The net gas flow direction through the corona gap is from the outer edges of the cell inward towards an exit port in the approximate center of the cell. This eliminates parasitic arcing at the perimeter, greatly increases the life of the perimeter seal, and provides a homogenous gas flow which increases ozone output. The cell design allows both electrodes to be operated at high voltage, therefore reducing the effective kilovolts with respect to ground by half.

13 Claims, 6 Drawing Sheets

FLAT PLATE CORONA CELL FOR GENERATING OZONE

BACKGROUND OF THE INVENTION

1. Field of the Invention

This invention relates generally to devices which generate ozone by applying a high voltage across a gap to create a corona discharge, and more specifically to a new type of flat plate ozone generating cell.

2. Description of the Prior Art

Ozone is a very powerful gaseous reactant, and its usefulness has been well established for many years in a wide range of industrial applications. Recently its value in all types of water purification applications has been coming to the fore because of its ability to act as a powerful oxidant, microflocculant and disinfectant without producing toxic side-products.

The most widely used method of generating ozone is to flow dry air or oxygen through a narrow gap bordered on one side by a conductive electrode and on the other side by a dielectric electrode (surfaced on the side which faces away from the gap with an electrical conductor). An alternating high voltage is connected across the electrodes, producing a high voltage field across the gap which creates a corona discharge. This discharge, which is also known as a "silent discharge" or "cold plasma discharge" and is actually composed of many transient microdischarges, converts a percentage of the gas to ozone. The dielectric is necessary to prevent these microdischarges from becoming arcs between the conductive electrodes, which would rapidly destroy the electrode surfaces.

The majority of high quality prior art corona ozone generators have been designed for large-scale industrial-type applications. Today there is a great need in numerous water treatment applications for small stand-alone cells which are very reliable and yet reasonable in cost and easily maintained. Much of the prior art that has addressed this need consists of scaled down versions of previous designs, and because they still retain many of the large-scale design features, are often extremely expensive, and are difficult to assemble and service. Corona ozone generators usually fall into one of two general categories: either the concentric tubular type, in which an elongate annular corona gap is created between a metal tube and a dielectric tube, or the flat plate type, in which a flat corona gap is formed between a metal plate and a dielectric plate. Both types are well known in prior art, with numerous patents having been issued for designs in both categories.

The present invention is an improved flat plate type, and has been created to fulfill the need for a reliable and inexpensive small ozone generator cell which solves the five basic problems inherent in most prior art flat plate designs, which are as follows:

1. Flat plate cells have a rather long perimeter which requires sealing along its entire length. Most cells must utilize seals or gaskets of an elastomeric material which is not entirely resistant to ozone. Ideally, the seal would be of a material which is completely inert to ozone, nitric oxides, and nitric acid. (A by-product of ozone generation is a very small amount of nitric oxides, and even the tiny amount of humidity in the "dry" feed gas usually used converts some of this to nitric acid.) A completely inert elastomeric material is prohibitively expensive, and therefore silicone is often used, which is resistant but not inert to nitric acid and to concentrated ozone, and has to be replaced after about every two years of operation.

2. Seal clamping and plate spacing means usually put pressure on and occasionally break the dielectric plate.

3. Parasitic arcing can occur at the cell perimeter inside the cell. Such arcing erodes the conductive electrode surfaces (and the rougher the surfaces become, the more easily arcing occurs), fatigues the dielectric which hastens its failure, and rapidly destroys the perimeter seal. The arcing occurs most easily and at a lower voltage at the higher ozone and/or corona ion concentrations. In addition, significant amounts of arcing can draw excessive currents from the electronics and high voltage transformer, thereby shortening their life. Arcing also produces large amounts of electromagnetic interference, which can disturb the operation of the power supply and other equipment.

4. Arcing outside of the cell. This external arcing becomes more likely as the ambient humidity increases. It produces ozone outside of the cell, which is extremely undesirable because this ozone ends up inside the electronics cabinet and in the ambient air. Prior art has immersed the cell in oil to prevent such arcing.

5. Dead spaces where gas flow in the corona gap stagnates or temporarily reverses, causing hot spots, reduced ozone generation efficiency, and dielectric fatigue. This problem is inherent when trying to obtain linear flow between the gas entrance and exit holes of most prior art flat plates. The problem can be lessened but not solved through the use of flow baffles. Such baffles usually have to be made of elastomeric materials to be effective, but any elastomer would be quickly degraded in this location because it would be exposed directly to corona bombardment and high ozone concentrations.

SUMMARY OF THE INVENTION

The flat plate corona cell of the present invention utilizes a generally centripetal radial gas flow design, and comprises an outer housing or shell around a perimeter, two electrically conductive electrodes with inter-electrode spacing means, either a thin flat plate of dielectric material positioned between the two conductive electrodes with dielectric plate spacing/aligning-/holding means or a dielectric layer on one or both of the conductive electrodes, a distribution area which serves to distribute the incoming gas around the perimeter of the cell, a generally flat corona chamber on either one or both sides of the dielectric with a total corona gap thickness of between about 0.5 to 3 mm, a perimeter sealing means which surrounds the distribution area, one or more generally peripheral air or oxygen inlets, and one or more generally central ozone outlets. The distribution area is interposed between the shell/perimeter seal and the first edge of the corona, so that neither the shell nor the seal is exposed to corona bombardment, and no ozone is generated in the gas flow until the flow is some distance from the shell and the perimeter seal. Thus, the outer edges of the cell are continuously flushed by the incoming gas and do not experience high ozone concentrations.

The distribution area and/or the corona chamber can be designed to induce inward spiral flow, although the preferred embodiment employs simple radial inward flow across the corona gap. Cooling can be performed in several ways, including radiation and passive air convection, fins or other method of increasing the surface area of the external surfaces of the cell, the use of a blower or fan, liquid cooling, or direct thermoelectric cooling of a ground electrode. (Ozone generation by corona discharge results in the conversion of 90% of the power used into heat. Heating lowers the ozone output, and therefore some method for cooling the electrodes is desirable.) Means of attaching high voltage connections to the conductive electrodes is provided. The manufacture of the present invention can be carried out very inexpensively, especially when the conductive electrodes are formed by stamping, with a simple assembly of two conductive electrodes, a plain bare dielectric plate, and at least three small spacers inside a short cylindrical shell enclosure cut from a standard glass tube or PVC pipe of appropriate diameter, sealed together with a silicone adhesive. Because of the convergent radial flow design of the present invention, the shell as well as the perimeter seal do not have to be made of materials which are totally inert to ozone.

The flat plate corona cell of the present invention effectively solves all of the above-referenced prior art problems simultaneously:

1. The perimeter seal is no longer exposed to high concentrations of ozone, thereby extending the life of an ozone-resistant elastomeric seal indefinitely.

2. The sealing and plate spacing means used place no strain on the dielectric plate.

3. The lowered ozone concentration at the perimeter raises the threshold KV (kilovolts) for parasitic arcing, thereby increasing the margin of safety between the operating KV and the KV where parasitic arcing first occurs. This benefit of centripetal gas flow is demonstrated by the following experiment: in the preferred embodiment of the present invention, with flow in the centripetal direction the arcing threshold is 18 KV peak, but if the flow direction is reversed so that the maximum ozone concentration now comes into contact with the perimeter, the arc threshold drops to 15 KV peak (the typical operating voltage of the preferred embodiment is between 8 and 11 KV peak).

4. External arcing is eliminated due to the long electrical path and moisture isolation provided by the shell and isolator plate of the present invention.

5. Due to the generally symmetrical radial flow, the possibility of dead spaces in the corona is completely eliminated, thereby increasing the efficiency of ozone generation and avoiding dielectric fatigue.

BRIEF DESCRIPTION OF THE DRAWINGS

FIGS. 4a–4c are side elevation cross-sectional views of alternate dielectric plate and conductive electrode aligning/spacing/supporting means for use in divided-gap configurations of a flat plate corona cell;

FIGS. 5a and 5b are side elevation cross-sectional views of single-gap configurations of a flat plate corona cell of this invention;

DETAILED DESCRIPTION OF THE INVENTION

Figure 1:
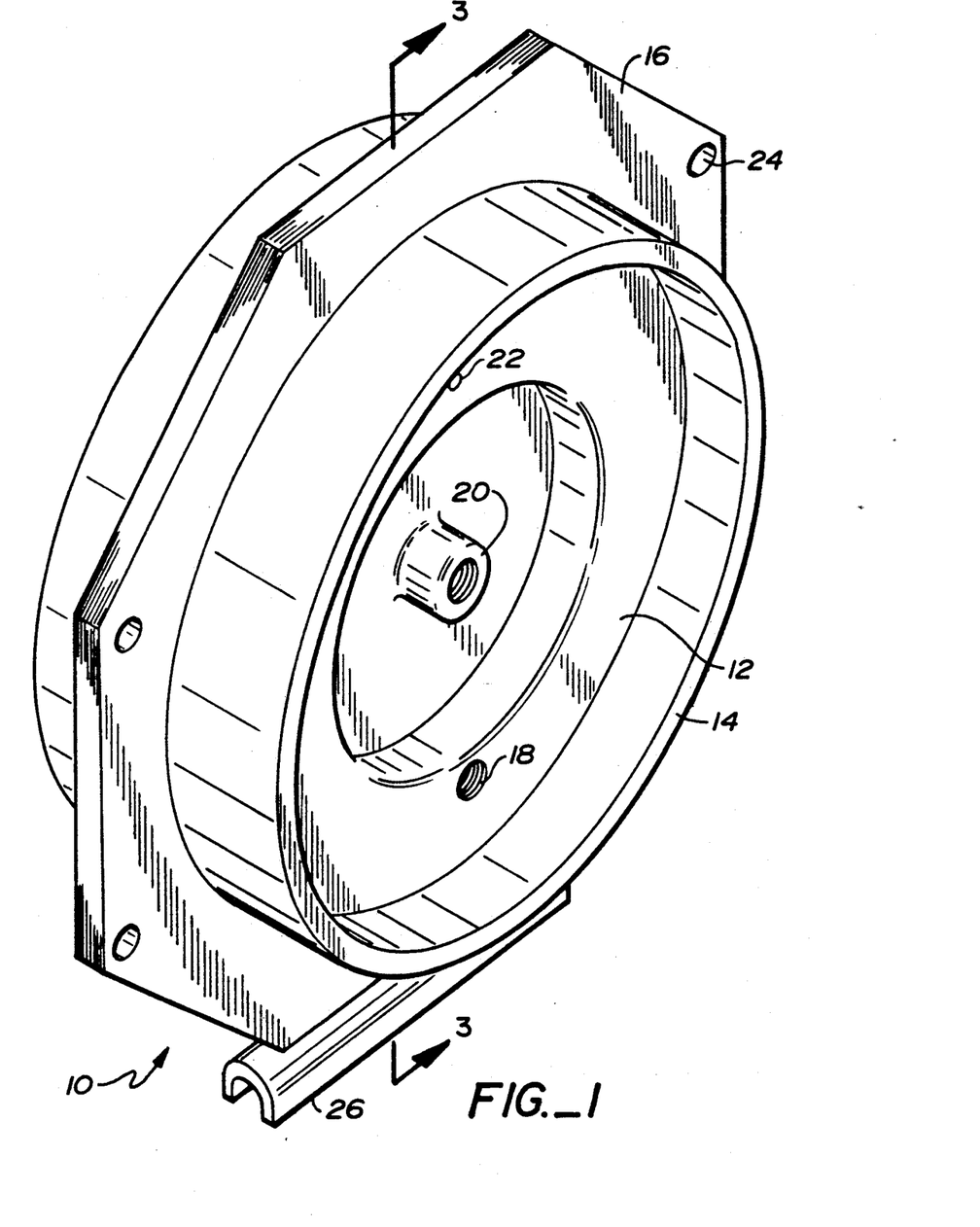
FIG. 1 is a perspective view of a flat plate corona cell of the present invention.

FIG. 1 is a perspective view of a flat plate corona cell 10 of the present invention. This view illustrates the assembled spatial relationship between a first conductive electrode plate 12, a housing or shell 14, and an isolator plate 16 (the second conductive electrode and the dielectric plate are not visible in this view). First electrode 12 may include gas inlet 18, ozone outlet 20, and high voltage connection 22. Isolator plate 16 bears mounting holes 24 to secure the assembly to a mounting plate or other structure, and may include a condensation path separator 26, described infra.

Figure 2A:
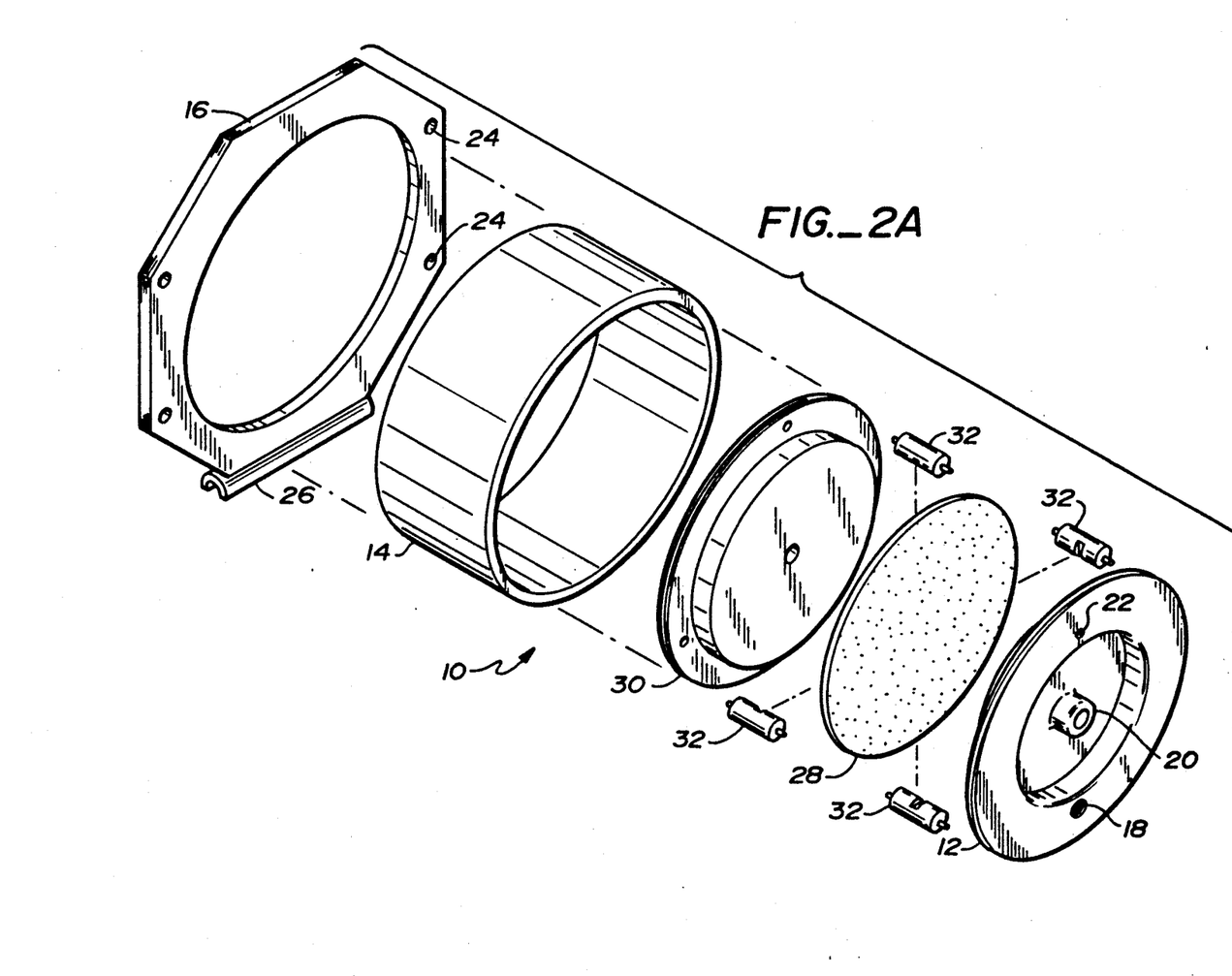
FIG. 2a is an exploded perspective view of the flat plate corona cell of FIG. 1.

FIG. 2a is an exploded perspective view of the flat plate corona cell 10 of FIG. 1. This view illustrates that first conductive electrode plate 12 is positioned adjacent dielectric plate 28 and second conductive electrode plate 30 by a plurality of spacers 32. These assembled components are contained within cylindrical perimeter shell 14, which in turn fits within isolator plate 16. These components are preferably held in their assembled position by silicone adhesive or similar sealing material, as described infra.

Figure 2B:
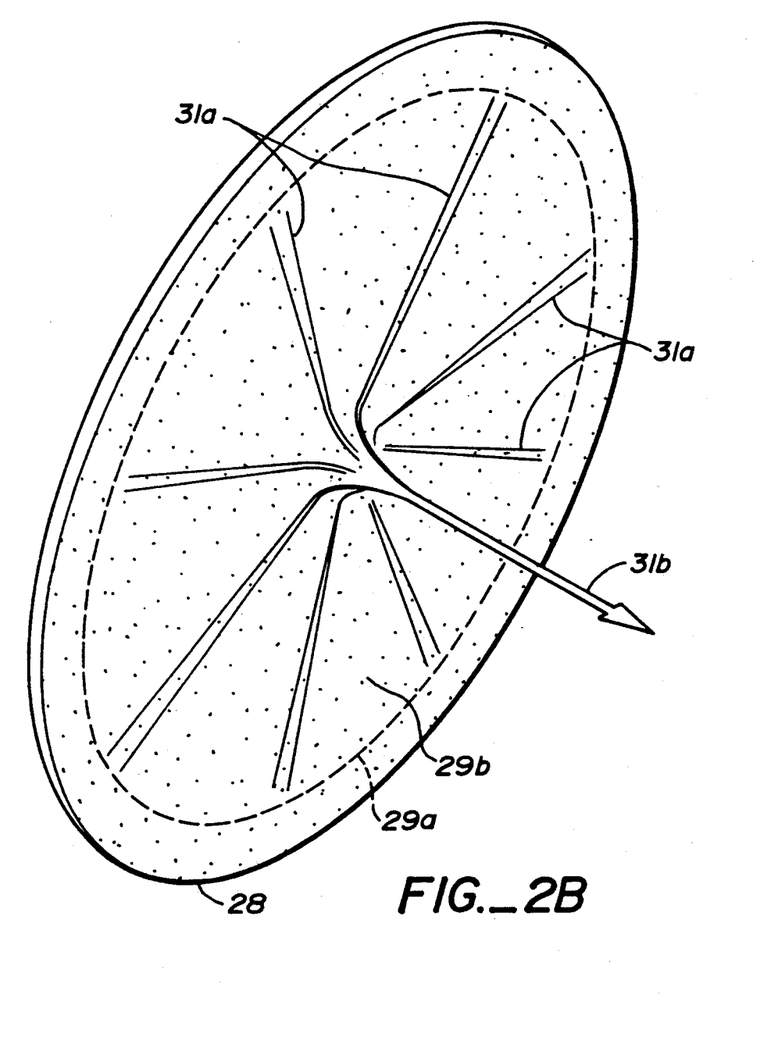
FIG. 2b is a perspective view of the dielectric plate of FIG. 2a, illustrating the inwardly radial gas flow across the corona surface of the dielectric plate.

FIG. 2b shows the gas flow on one side of dielectric plate 28 of FIG. 2a. It illustrates the outer boundary 29a of the corona surface 29b, and the radially converging inward gas flow pattern across the corona surface (arrows 31a). Arrow 31b represents the gas flow exiting through an ozone outlet. A similar inward gas flow occurs across the corona surface on the other side of the plate, and exits through the corresponding ozone outlet.

Figure 3:
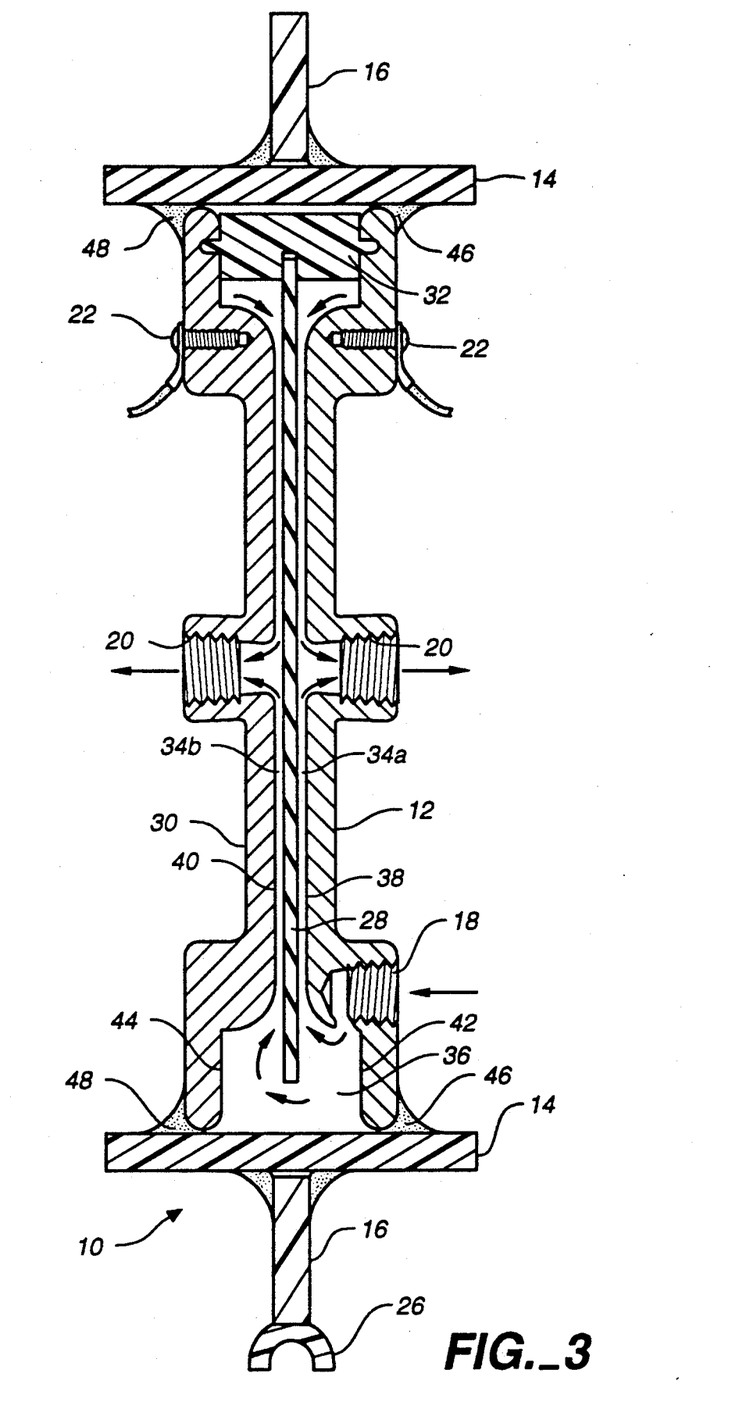
FIG. 3 is a side elevation cross-sectional view of the flat plate corona cell, this view being taken along line 3—3 of FIG. 1.

FIG. 3 is a side elevation cross-sectional view of the flat plate corona cell 10, this view taken along line 3—3 of FIG. 1. The thin dielectric plate 28 (in this case a disc) is suspended between the two conductive electrode plates 12, 30 to form a dual or divided corona gap 34a, b. The use of a simple bare dielectric plate makes construction very easy and performance extremely reliable because it avoids having to either coat a dielectric with a conductive layer, glue a dielectric to a conductive plate, or coat a conductive plate with a dielectric layer, and also avoids the problems of arcing and of dielectric high voltage stress and punch-through which can occur when a sharp-edged conductive layer applied to a dielectric surface is connected to a high voltage. In addition, the absence of a conductive surface eliminates most of the electrostatic attraction/relaxation oscillatory forces on the dielectric, which at the high voltages and narrow gaps typically employed in ozone generators can significantly stress a thin dielectric plate.

The conductive electrode plates and dielectric plate may be generally circular or may be rounded rectangles or squares in any combination, as long as all conductive edges are rounded with rather large radii to reduce the non-linear high-voltage field effects which can lead to parasitic corona and arcing, and provided that the dielectric plate extends radially beyond the outer perimeter of the corona gap formed between the conductive electrodes in order to prevent arcing between the electrodes. The conductive electrodes are preferably of the same size and shape, and may be machined from a solid plate of metal such as aluminum. Alternatively, the electrodes may be spun, stamped, or formed by any means from a thinner sheet, with a tubular extrusion and/or welded tube extension at the ozone outlet, an S-curve step and a rolled perimeter, all of which help to stiffen the stamped sheet.

Through the use of at least three small peripheral supporting spacers 32 this design provides for automatic spacing and self-alignment in all directions of all components with respect to each other during assembly, resulting in an accurate, uniform corona gap between the generally flat central portions of the faces of the two conductive electrodes 12, 30 and simultaneously creating a gas distribution chamber or area 36 which extends around the perimeter. The thickness of the corona gap 34a, b is dependent on the thickness of the dielectric plate 28, the length of the spacers 32, and on the amount of offset between the plane of the corona surfaces 38, 40 of the electrodes and the plane of the generally flat offset surfaces 42, 44 near the perimeter of the electrodes on which the spacers sit. Since both of these planes are on the same side (the inside) of the conductive electrodes, the thickness of the electrode plates is not at all critical, thus reducing the cost of fabrication.

The face cross-sections of the spacers can be circular or rectangular, i.e., they can be either a slotted rod or a slotted block, or they can be of any other configuration. The spacers can either be manufactured as one piece including end protrusions, or dowel pins can be inserted into holes in the ends.

The electrodes are sealed externally at perimeter seal 46, 48 to the cylindrical shell 14 (of non-conductive ozone-resistant material such as glass, ceramic, or PVC) by means of an ozone-resistant adhesive such as silicone, which also serves to fasten the whole assembly together. Thus the dimensional tolerances of the shell and the positioning for gluing are not critical. It is far more accurate, easier and less expensive to rely on the small precision spacers for alignment, than on a precisely machined shell or on precise gluing. The dielectric plate is aligned and supported by the spacers without any strain, freely allowing for differential thermal expansion and contraction. This floating support means, together with the absence of high voltage stress, electrostatic vibrations and any need for the dielectric to perform a structural or sealing function, provides a very high level of reliability and allows a thinner dielectric to be used, which greatly increases the ozone output of the cell. A key feature of the preferred embodiment is that the dielectric is completely enclosed inside the cell with a free gas passage (via the distribution area 36) connecting both of its sides, and thus there is never any differential air pressure across the dielectric, no matter what the operating pressure inside the cell may be. Flatness tolerances (bow, camber, or warp) of the dielectric plate are much less critical than in prior art corona cells since the uniformity of the high voltage field across the gap is now determined by the flatness and spacing of only the conductive plate electrodes. A further advantage of this configuration is that in the remote possibility of breakage of the dielectric plate, the integrity of the cell would not be impaired, so that any arcing would be contained between the conductive plates, and no ozone could leak out into the ambient air.

Figure 5A:
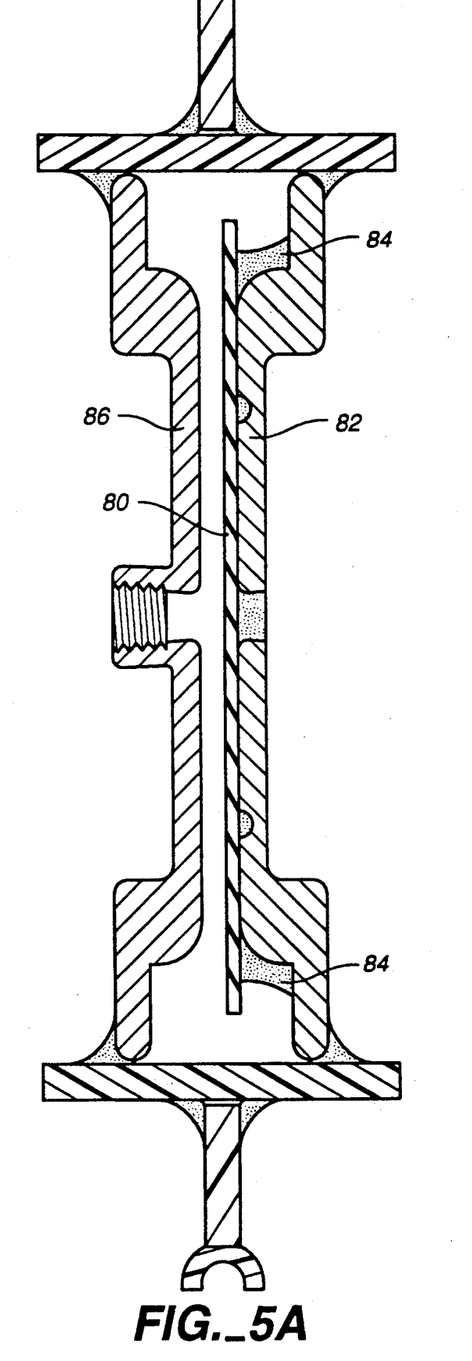
FIG. 5a illustrates a dielectric plate attached to one of the conductive electrodes.
Figure 5B:
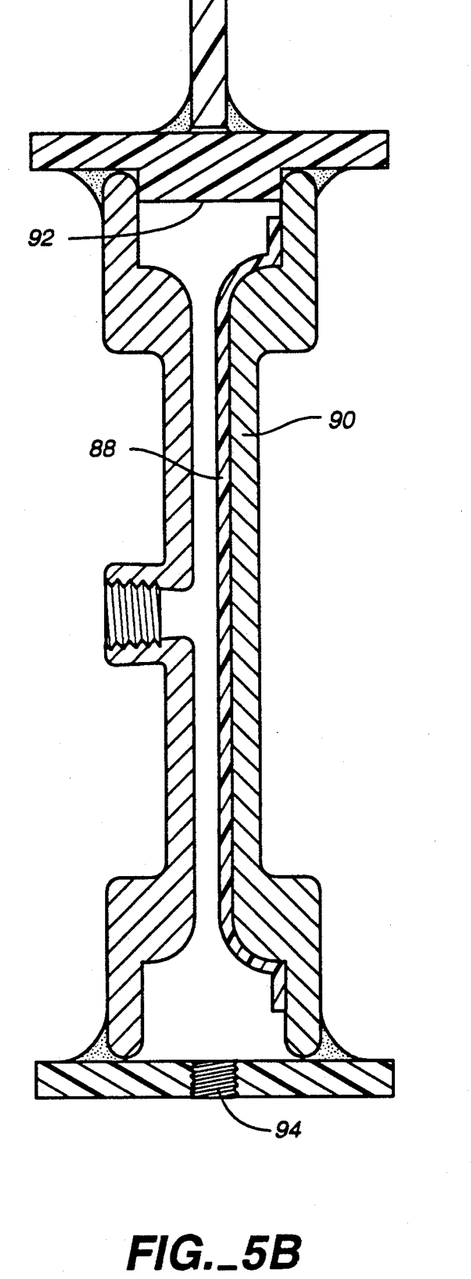
FIG. 5b illustrates a dielectric coating on one of the conductive electrodes, an alternate conductive electrode spacing means, and an alternate gas inlet in the outer shell.

The gas inlet 18 may be in either one or both conductive plates, or in the shell (see inlet 94 in FIG. 5b infra). The inlet feeds into the circumferential gas distribution area 36 which lies between the perimeter seal and the corona gap. The spacers are also positioned in this area. The distribution area may be formed as the space between the juxtaposed offset surfaces 42, 44 of the two conductive electrodes. These offset surfaces serve a number of important functions simultaneously: they can be used to form the gas distribution area 36; they serve to maximize the distance between the edges of the conductive electrodes which extend beyond the edge of the dielectric plate so that no arcing can occur between them; they provide a wide enough edge gap without the dielectric being in the way for spacers to be able to space and align the conductive plates, thereby at the same time spacing the corona gap itself, and also spacing, aligning and supporting the dielectric, yet without the spacers being in the corona. These functions can also be fulfilled in other ways, as described infra.

Thus the corona gap is isolated at a distance from the perimeter seal by the distribution area, and the corona contacts only the conductive electrodes and the dielectric plate in the corona gap area, and not the seal, enclosure shell, or spacers. The concentration of ozone in the vicinity of the perimeter seal of the preferred embodiment is about one-twentieth of its concentration at the central ozone outlet. The ozone outlet does not require an elastomer seal because it can utilize either a pipe thread fitting sealed with teflon tape or a tubing fitting.

An important benefit of the design of the present invention is that since the outer sides of both conductive electrodes are exposed directly to ambient air, efficient air-cooling is a simple matter, resulting in heat being removed from both sides of the corona gap to increase ozone output. The plastic isolator plate 16 is sealed to the outside of the shell with either silicone or gaskets such as removable o-rings. Cemented to the bottom of the isolator plate is an optional condensation path separator 26. Thus the outer surfaces of the conductive electrodes are well-insulated from each other with a long path between them, and the geometry of the assembly is such that it is "drip-proof" and condensation or dust, etc. will not induce arcing between the electrodes.

Most prior art ozone cell construction requires that one electrode be at ground potential. The present invention has been designed to be able to operate either with one electrode grounded and the other at 7 KV RMS (equivalent to about 10 KV peak) or preferably with both electrodes at 3.5 KV RMS (generally 180 degrees out of phase from each other). Operating both electrodes at high voltage effectively halves the KV with respect to ground found on any portion of the cell, which together with the generous radii of all external surfaces eliminates problems of corona, arcing and ozone formation on the outside of the cell. This greatly increases safety, makes mounting and weather protection less critical and UL approval less difficult, and allows the use of less expensive and more commonly available high-voltage transformers such as the midpoint ground type of neon-sign transformer. The corona of the cell of the present invention ignites easily at all temperatures without requiring a special starting circuit.

Typical performance of the preferred embodiment with a 5 inch diameter corona surface under conditions of continuous operation at an ambient temperature of 80 degrees F. is: an ozone output of 0.6 grams of ozone per hour at a concentration of 1.65% ozone, with 1 cubic foot/hour of dry (−100 degree dewpoint) air input and a high voltage input of 3.5 KV RMS/side (7 KV RMS differential) at 60 hertz. Power usage is about 14 watts.

Figure 4A:
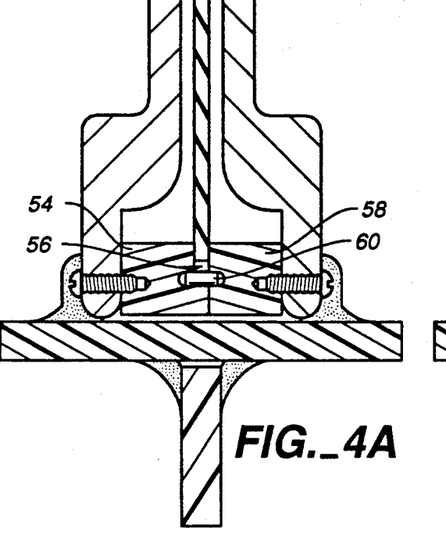
FIG. 4a illustrates a notched/flat-faced spacer arrangement.
Figure 4B:
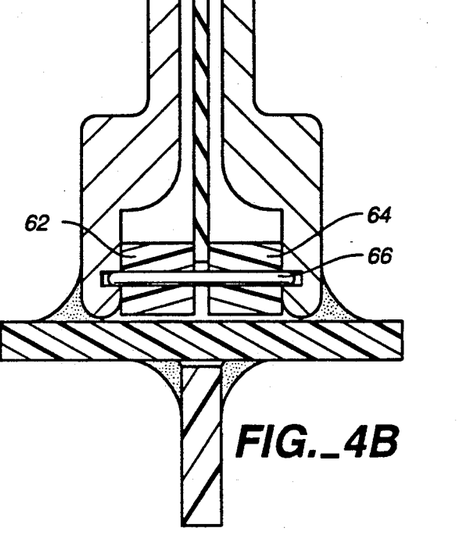
FIG. 4b illustrates a pair of flat-faced spacers capturing the dielectric plate between them.
Figure 4C:
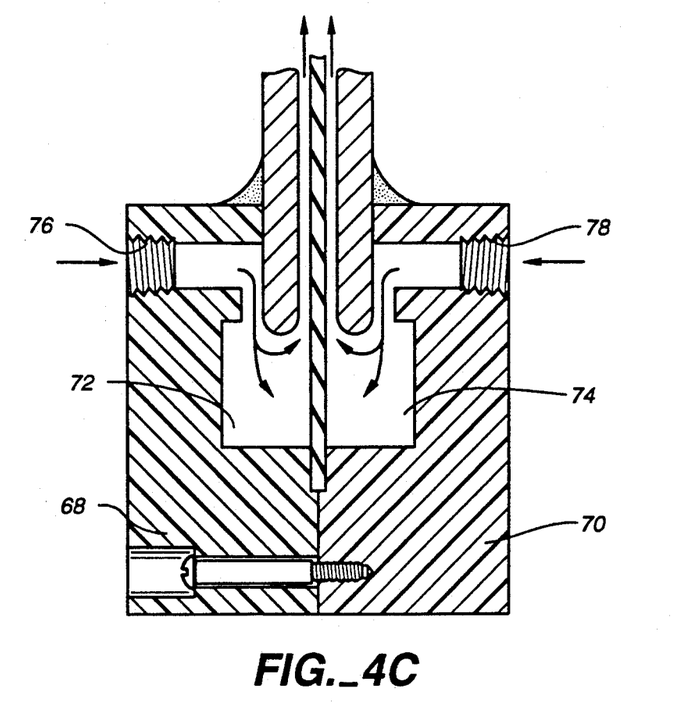
FIG. 4c illustrates a different cell embodiment utilizing a split shell.

FIGS. 4a–4c are side elevation cross-sectional views of alternate dielectric plate and conductive electrode aligning/spacing/supporting means for use in divided-gap configurations of a flat plate corona cell. All of these means can be used with either machined or stamped/formed conductive electrodes. These figures also show the silicone adhesive which seals and fastens the conductive electrodes to the shell. The spacers (preferably a minimum of three per cell) and their dowel pins are to be machined or molded of an ozone-inert electrically non-conductive material such a fluorocarbon plastic or a ceramic. In cases where the dowel pins do not extend all the way through the spacer, the pins could be of metal or could be screws, or any combination thereof. The features of the different spacer configurations can be interchanged or combined, e.g., the spacer of FIG. 4b could alternatively use either the short pin and screws of FIG. 4a, or the short pin of FIG. 4a and the end pins or protrusions of spacer 32, or a medium length pin and a screw, etc. In lieu of pins or screws, an adhesive could be used to adhere the spacers to the shell.

FIG. 4a shows a spacer configuration consisting of a notched space 54 forming a plate-supporting slot 56 adjacent a flat-faced spacer 58, each attached to a conductive electrode by a screw, and connected to each other by a central dowel-pin 60. FIG. 4b shows two flat-faced spacers 62, 64 capturing the dielectric plate between them and aligned with a through-pin 66 (this spacer configuration functions differently in that it puts a slight pressure across the thickness of the dielectric plate). FIG. 4c illustrates a different divided gap embodiment utilizing a split shell 68, 70 which serves as aligning/spacing/supporting means as well as forming two gas distribution areas 72, 74 (which are to be fed incoming gas through gas inlets 76, 78 from a single tee to avoid any differential pressure across the dielectric plate).

FIGS. 5a and 5b are side elevation cross-sectional views of single-gap configurations of a flat plate corona cell of this invention. FIG. 5a shows a dielectric plate 80 cemented to one of the conductive electrodes 82, and can employ a silicone fill 84 where shown to prevent corona from occurring around the edge between the dielectric and the electrode to which it is affixed (the fill would be unnecessary if the flat portion of electrode 86 were smaller in diameter than its complementary electrode 82). FIG. 5b shows a coating 88 of a dielectric material on one (or could also be on both) conductive electrode 90, an alternate conductive electrode spacing means 92, and an alternate gas inlet means 94 which is a port in the perimeter shell. The configurations pictured in FIGS. 5a and 5b can employ spacing means with features similar to those illustrated in the previous figures, but modified so that the spacing means does not support the dielectric plate.

Optionally, in any of the embodiments, instead of a corona gap which is completely flat and of constant thickness throughout, the gap can be made to vary in thickness, either narrower at the periphery and widening towards the center or vice versa, by slightly tapering the angle of the electrode surfaces, i.e., by giving one or both electrodes a slightly conical surface, either straight or curved, concave or convex.

While this invention has been described in connection with preferred embodiments thereof, it is obvious that modifications and changes therein may be made by those skilled in the art to which it pertains without departing from the spirit and scope of this invention. Accordingly, the scope of this invention is to be limited only by the appended claims.

What is claimed as invention is:

1. A flat plate corona cell for generating ozone, said cell comprising:
   a first conductive electrode plate member having an inside surface, and generally defining a first plane over at least a portion of said inside surface, said first conductive electrode plate member having a perimeter;
   a second conductive electrode plate member having an inside surface, and generally defining a second plane over at least a portion of said inside surface, said second plane being generally parallel to said first plane, said second conductive electrode plate member having a perimeter;
   a dielectric member interposed between said first and second conductive electrode plate members, said dielectric member defining at least one surface of at least one corona chamber;
   a gas distribution chamber generally extending around the perimeter of said first and second conductive electrode plate members;
   inlet means for introduction of a gas into said gas distribution chamber; and
   outlet means for passage of a gas from said corona chamber, said outlet means comprising a port generally centrally located in at least one of said conductive electrode plate members, wherein a gas introduced into said inlet means is urged to flow in a generally converging radially inward pattern from said distribution chamber, through said corona chamber, and out through said outlet means.

2. The flat plate corona cell of claim 1 wherein said gas distribution chamber is formed by a perimeter shell bounding said first and second conductive electrode plate members.

3. The flat plate corona cell of claim 1 including spacing means for alignment of said first conductive electrode plate member and said second conductive electrode plate member.

4. The flat plate corona cell of claim 3 wherein said spacing means aligns said dielectric member between said first and second conductive electrode plate members.

5. The flat plate corona cell of claim 3 wherein said spacing means comprises at least three spacer members positioned within said gas distribution chamber.

6. The flat plate corona cell of claim 2 wherein said perimeter shell includes spacing means for alignment of said first conductive electrode plate member and said second conductive electrode plate member.

7. The flat plate corona cell of claim 2 wherein said perimeter shell includes spacing means for alignment of said dielectric member between said first and second conductive electrode plate members.

8. The flat plate corona cell of claim 1 wherein said first and second conductive electrode plate members are generally circular in shape, and said gas distribution chamber comprises a circumferential shell.

9. The flat plate corona cell of claim 1 wherein said dielectric member comprises a flat plate positioned between said first and second conductive electrode plate members, and defines two corona chambers.

10. The flat plate corona cell of claim 1 wherein said dielectric member comprises a flat plate affixed to at least one of said first and second conductive electrode plate members, and defines at least one surface of a corona chamber.

11. The flat plate corona cell of claim 1 wherein said dielectric member comprises a coating of dielectric material on at least one of said first and second conductive electrode plate members, and defines at least one surface of a corona chamber.

12. The flat plate corona cell of claim 1 wherein said inlet means for introduction of a gas is in at least one of said conductive electrode plate members.

13. The flat plate corona cell of claim 2 wherein said perimeter shell bears said inlet means for introduction of a gas.

* * * * *